(12) United States Patent
Noguchi

(10) Patent No.: US 9,612,399 B2
(45) Date of Patent: Apr. 4, 2017

(54) METHOD FOR MANUFACTURING OPTICAL FIBER COMBINER, OPTICAL FIBER COMBINER, AND LASER DEVICE

(71) Applicant: FUJIKURA LTD., Tokyo (JP)

(72) Inventor: Yoshikiyo Noguchi, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 14/905,508

(22) PCT Filed: Mar. 31, 2014

(86) PCT No.: PCT/JP2014/059428
§ 371 (c)(1),
(2) Date: Jan. 15, 2016

(87) PCT Pub. No.: WO2015/008510
PCT Pub. Date: Jan. 22, 2015

(65) Prior Publication Data
US 2016/0154182 A1    Jun. 2, 2016

(30) Foreign Application Priority Data
Jul. 18, 2013 (JP) .................. 2013-149850

(51) Int. Cl.
*G02B 6/255* (2006.01)
*G02B 6/28* (2006.01)
(Continued)

(52) U.S. Cl.
CPC .............. *G02B 6/2808* (2013.01); *G02B 6/06* (2013.01); *G02B 6/2551* (2013.01);
(Continued)

(58) Field of Classification Search
CPC ...... G02B 6/2808; G02B 6/06; G02B 6/2551; G02B 6/2558
(Continued)

(56) References Cited

U.S. PATENT DOCUMENTS

| 2010/0118897 A1* | 5/2010 | Tanigawa ........... G02B 6/02042 372/6 |
| 2012/0206793 A1 | 8/2012 | Tanaka |
| 2014/0205236 A1 | 7/2014 | Noguchi et al. |

FOREIGN PATENT DOCUMENTS

| JP | 5216151 B1 | 6/2013 |
| WO | 2009/077636 A1 | 6/2009 |

(Continued)

OTHER PUBLICATIONS

International Search Report dated Jul. 1, 2014, issued in Counterpart of PCT/JP2014/059428 (2 pages).

*Primary Examiner* — Jerry Blevins
(74) *Attorney, Agent, or Firm* — Westerman, Hattori, Daniels & Adrian, LLP

(57) ABSTRACT

Optical fiber combiner includes a plurality of input optical fibers having a core and a cladding surrounding the core, a bridge fiber having a portion that transmits a light beam entered from each of the input optical fibers, and a glass member fusion-spliced to an end face of the cladding and to a first end face of the bridge fiber. The end portions of the claddings of the plurality of input optical fibers are bundled on at least a first end face side, with the adjacent side surfaces of the claddings being in contact with each other. The glass member has an outer diameter greater than the diameter of the core and smaller than the outer diameter of the cladding. The adjacent glass members are in a non-fusion-spliced state.

10 Claims, 7 Drawing Sheets

(51) Int. Cl.
*G02B 6/06* (2006.01)
*H01S 3/00* (2006.01)

(52) U.S. Cl.
CPC .......... *G02B 6/2558* (2013.01); *H01S 3/0071* (2013.01); *G02B 6/2856* (2013.01)

(58) Field of Classification Search
USPC .............................................. 385/96; 65/407
See application file for complete search history.

(56) References Cited

FOREIGN PATENT DOCUMENTS

WO   2011/052373 A1   5/2011
WO   2013/038761 A1   3/2013

\* cited by examiner

METHOD FOR MANUFACTURING OPTICAL FIBER COMBINER, OPTICAL FIBER COMBINER, AND LASER DEVICE

TECHNICAL FIELD

The present invention relates to a method for manufacturing an optical fiber combiner, an optical fiber combiner, and a laser device.

BACKGROUND ART

Since laser devices are enabled to perform processing in a non-contact manner, laser devices are used in various fields, such as processing fields and medical fields. Laser devices are demanded to emit light beams of higher power.

For one of methods for attaining such high power laser devices, there is a method in which laser light beams emitted from a plurality of optical fibers are combined at an optical fiber combiner and then the combined laser light beams are emitted from one optical fiber. Patent Literature 1 below describes an optical fiber combiner usable in such laser devices.

In the optical fiber combiner described in Patent Literature 1, a divergence angle reducing member is provided between a plurality of input optical fibers and a bridge fiber having a tapered portion, in which the divergence angle reducing member emits the light beam emitted from the input optical fiber at an angle of divergence smaller than the angle of divergence of the entered light beam.

One end of the divergence angle reducing member is fusion-spliced to one end of each of the input optical fibers. The other end of the divergence angle reducing member is fusion-spliced to the input end face of the bridge fiber.
[Patent Literature 1] Japanese Patent No. 5216151

SUMMARY OF INVENTION

The input optical fibers described in Patent Literature 1 above are often bundled with the side surfaces of the input optical fibers being in contact with each other. In other words, as described in paragraph 49 in Patent Literature 1 above, the angle of divergence of a light beam is increased in accordance with the ratio of a diameter $D_{in}$ of the incident end face to a diameter $D_{out}$ of the outgoing end face of the bridge fiber, and components exceeding the allowable numerical aperture (NA) leak from an output optical fiber in the subsequent stage of the bridge fiber. Therefore, desirably, the diameter $D_{in}$ of the incident end face of the bridge fiber is as small as possible. This is one of reasons that each of the input optical fibers is often bundled with the side surfaces being in contact with each other.

However, in a bundle of the input optical fibers described in Patent Literature 1 above, the divergence angle reducing members are fusion-spliced to one ends of the input optical fibers. In the case in which the divergence angle reducing members are fusion-spliced to the input end face of the bridge fiber, the side surfaces of the divergence angle reducing members are more often fusion-spliced to each other.

In the case in which the side surfaces of the divergence angle reducing members are fusion-spliced to each other on the input end face of the bridge fiber, the fusion-spliced portions are often easily broken, caused by vibrations, an impact, or an external force, such as bending and tensile, applied to the fusion-spliced portions.

Such tendencies are similarly observed also in the case in which the divergence angle reducing members described in Patent Literature 1 are omitted, and a plurality of input optical fibers is directly fusion-spliced to a bridge fiber.

Therefore, it is an object of the present invention to provide a method for manufacturing an optical fiber combiner, an optical fiber combiner, and a laser device that can improve mechanical strength.

To achieve the objects described above, a method for manufacturing an optical fiber combiner includes: a first fusion splicing process of fusion-splicing a first end face of an input optical fiber to a first end face of a glass member, the input optical fiber having a core and a cladding surrounding the core, the glass member having an outer diameter greater than a diameter of the core and smaller than an outer diameter of the cladding; a bundle process of bundling the cladding of an end portion at least on the first end face side of a plurality of the input optical fibers after the first fusion splicing process, with adjacent side surfaces of the claddings being in contact with each other; and a second fusion splicing process of fusion-splicing a second end face of the each glass member to a first end face of a bridge fiber, the glass members being fusion-spliced to the plurality of the input optical fibers after the bundle process respectively.

In the method for manufacturing an optical fiber combiner, the claddings of the end portions on at least the first end face side of the input optical fibers are bundled so that the adjacent side surfaces of the claddings are in contact with each other. In this process, the outer diameter of the glass member, which is fusion-spliced to the first end face of the input optical fiber respectively, is set greater than the diameter of the core of the input optical fiber and smaller than the outer diameter of the cladding. Consequently, the glass members are separated from each other. Therefore, in the case in which the second end faces of the glass members are fusion-spliced to the first end face of the bridge fiber, the glass members can be in the non-fusion-spliced state without fusion-splicing the glass members to each other. Thus, it is possible to avoid the breakage of the fusion-spliced portion caused by an external force applied to the fusion-spliced portion. Accordingly, a method for manufacturing an optical fiber combiner that can improve mechanical strength is provided.

The method further includes, preferably, a fiber fixing process of providing a bundle cover layer that collectively covers the claddings bundled with adjacent side surfaces being in contact with each other.

In this case, the claddings of the input optical fibers are fixed with the bundle cover layer with the claddings being bundled. Consequently, even though vibrations, an impact, or an external force, such as bending and tensile, are applied to the optical combiner, a stress is nearly equally applied to the input optical fibers and the glass members fusion-spliced to the input optical fibers. Therefore, the mechanical strength of the optical fiber combiner can be further improved, compared with the case in which no bundle cover layer is provided.

Moreover, the fiber fixing process is performed, preferably, after the second fusion splicing process.

In this case, it is possible to prevent the thermal degradation of the bundle cover layer caused by heating the bundle cover layer in fusion splicing.

Moreover, the fiber fixing process includes, preferably, a process of collectively covering the glass member with a cover layer having a Young's modulus lower than a Young's modulus of the glass member.

In the case in which such a cover layer is provided, a stress produced on the fusion-spliced portion to the glass member is decreased in applying force to bend the input optical fiber or the output optical fiber. Consequently, shear, for example, can be decreased. Moreover, the cover layer can protect the glass member and prevent flaws.

Moreover, the bridge fiber has, preferably, a portion that transmits a light beam entered from the glass member, in which at least a part of the portion is formed with a tapered portion gradually tapered in diameter as more apart from the glass member, and the glass member is, preferably, a divergence angle reducing member that emits a light beam entered from the input optical fiber at an angle of divergence smaller than an angle of divergence of the entered light beam.

In this case, the angle of divergence of a light beam entered from the divergence angle reducing member to the bridge fiber is made smaller than the angle of divergence of a light beam directly entered from the input optical fiber to the bridge fiber. Consequently, even though, in the tapered portion, a light beam repeatedly reflects off and propagates to cause an increase in the angle of divergence, the angle of divergence of a light beam emitted from the bridge fiber can be made smaller. Accordingly, light beams to be entered to the output optical fiber at an angle exceeding the numerical aperture of the output optical fiber can be reduced. Thus, it is possible to reduce losses of light beams caused by the leakage of the light beams from the output optical fiber.

Moreover, an optical fiber combiner of the present invention includes: a plurality of input optical fibers having a core and a cladding surrounding the core; a bridge fiber having a portion that transmits a light beam emitted from each of the input optical fibers; and a glass member fusion-spliced to an end face of each of the claddings and to a first end face of the bridge fiber, end portions of the claddings of the plurality of input optical fibers being bundled on at least a first end face side, adjacent side surfaces of the claddings being in contact with each other, the glass member having an outer diameter greater than a diameter of the core and smaller than an outer diameter of the cladding, wherein the glass members adjacent to each other are in a non-fusion-spliced state.

In this optical fiber combiner, the glass members are not fusion-spliced to each other. Consequently, it is possible to avoid the breakage of the fusion-spliced portion caused by an external force applied to the fusion-spliced portion. Accordingly, an optical fiber combiner that can improve mechanical strength is provided.

Moreover, an optical fiber combiner according to the present invention is an optical fiber combiner including: a plurality of input optical fibers having a core and a cladding surrounding the core; a plurality of rod-shaped divergence angle reducing members that emits a light beam entered from the input optical fiber at an angle of divergence smaller than an angle of divergence of the entered light beam; a bridge fiber having a portion that transmits a light beam entered from each of the divergence angle reducing members, in which at least a part of the portion is formed with a tapered portion gradually tapered in diameter as more apart from the divergence angle reducing member side; and an output optical fiber that receives a light beam emitted from an opposite side of the bridge fiber where the divergence angle reducing members are provided. In the optical fiber, an outer diameter of the divergence angle reducing member is greater than an outer diameter of the core and smaller than an outer diameter of the cladding, and the divergence angle reducing members adjacent to each other are in a non-fusion-spliced state.

In the optical fiber combiner, the angle of divergence of a light beam entered from the divergence angle reducing member to the bridge fiber is made smaller than the angle of divergence in the case in which a light beam is directly entered from the input optical fiber to the bridge fiber. Consequently, even though, in the bridge fiber, a light beam repeatedly reflects off and propagates to cause an increase in the angle of divergence, the angle of divergence of a light beam emitted from the bridge fiber can be made smaller. Accordingly, light beams to be entered to the output optical fiber at an angle exceeding the numerical aperture of the output optical fiber can be reduced. Thus, it is possible to reduce losses of light beams caused by the leakage of the light beams from the output optical fiber. In the optical fiber combiner, the divergence angle reducing members are not fusion-spliced to each other. Consequently, it is possible to avoid the breakage of the fusion-spliced portion caused by an external force applied to the fusion-spliced portion. Accordingly, an optical fiber combiner that can improve mechanical strength is provided.

A laser device according to the present invention is a laser device including: an optical fiber combiner described above; and a plurality of laser units that enters a laser light beam to the input optical fibers.

This laser device includes the above-described optical fiber combiner. Thus, mechanical strength is improved, compared with the case in which the optical fiber combiner is not provided. Accordingly, a laser device that can improve mechanical strength is provided.

As described above, in accordance with a method for manufacturing an optical fiber combiner, an optical fiber combiner, and a laser device according to the present invention, mechanical strength can be improved.

DESCRIPTION OF EMBODIMENTS

In the following, preferred embodiments according to the present invention will be described in detail with reference to the drawings.

(1) First Embodiment

Figure 1:
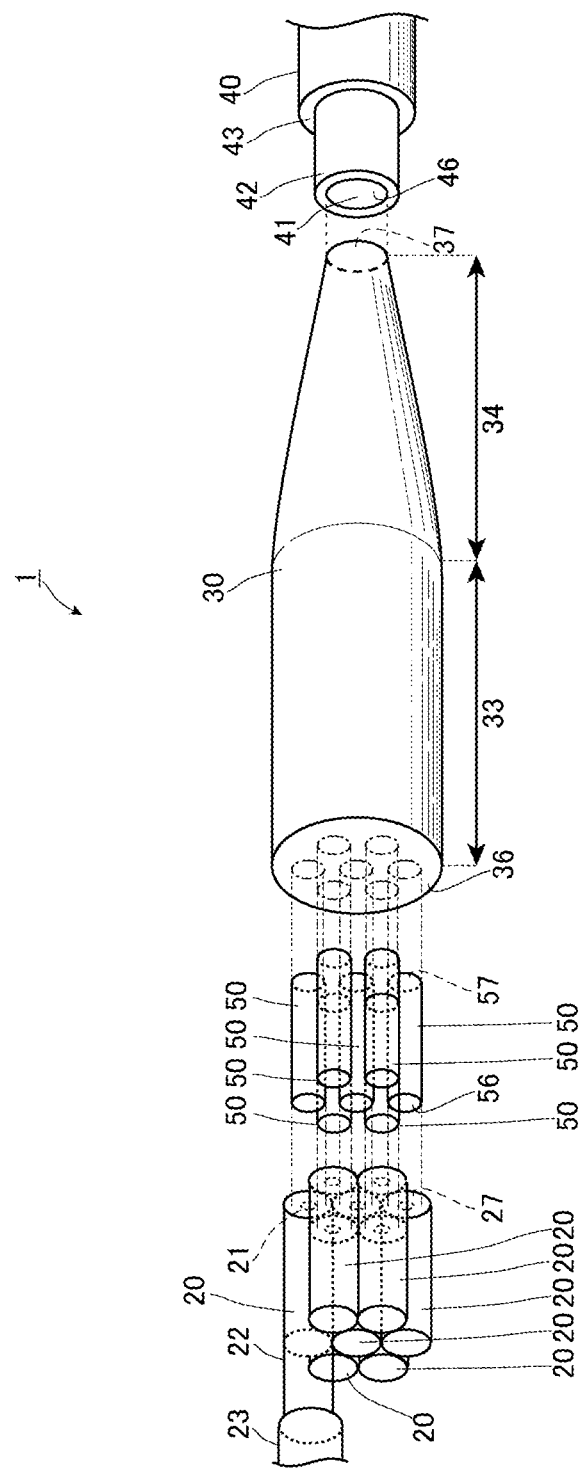
FIG. 1 is a diagram of an optical fiber combiner according to a first embodiment.

FIG. 1 is a diagram of an optical fiber combiner according to a first embodiment. In FIG. 1, for easy understanding, components configuring the optical fiber combiner are spaced.

As illustrated in FIG. 1, the optical fiber combiner 1 according to the embodiment includes a plurality of input optical fibers 20, a plurality of gradient index (GRIN) lens 50, a bridge fiber 30, and an output optical fiber 40 as main components.

The input optical fiber 20 is an optical fiber that enters light to the bridge fiber 30. Each of the input optical fibers 20 has a core 21, a cladding 22 surrounding the core 21, and a cover layer 23 covering the outer circumferential surface of the cladding 22. In FIG. 1, for convenience, only the cover layer 23 of one input optical fiber 20 is illustrated, and the cover layers of the other input optical fibers 20 are omitted.

The refractive index of the core 21 is set higher than the refractive index of the cladding 22. For example, the core 21 is formed of silica doped with a dopant, such as germanium (Ge), to increase the refractive index. The cladding 22 is formed of pure silica. The cover layer 23 is formed of a resin, for example.

In the case of the embodiment, six input optical fibers 20 surround one input optical fiber 20. The cover layer 23 is removed from one end portions of the input optical fibers 20. On the removed portions, a bundle cover layer is provided to collectively cover the outer circumferential surfaces of the claddings 22 of the input optical fibers 20 respectively. The bundle cover layer bundles each of the input optical fibers 20, and maintains the bundle state. In FIG. 1, for easy understanding, the bundle cover layer is omitted.

The GRIN lens 50 is a glass member, which is a divergence angle reducing member that receives a light beam entered from the input optical fiber 20 and emits the light beam at an angle of divergence smaller than an angle of divergence of the entered light beam. The term "angle of divergence" means a spread angle of a light beam propagating through the GRIN lens 50 along the optical axis of the light beam.

The GRIN lens 50 has a refractive index profile in the radial direction and no refractive index profile in the length direction. In the refractive index profile in the radial direction, the refractive index gradually changes from the center axis side to the outer circumferential surface side. The refractive index becomes higher to the center axis side and the refractive index is lower to the outer circumferential surface side. The GRIN lens 50 is formed of silica doped with a dopant, such as germanium (Ge), to increase the refractive index. The dopant is doped at higher concentration to the center axis side, for example. The length of each of the GRIN lenses 50 is a length other than a length n times a 0.5 pitch length with respect to a light beam entered from the input optical fiber 20, (where n is a natural number). Consequently, a light beam emitted from the GRIN lenses 50 has a smaller angle of divergence than the angle of divergence of a light beam entered to the GRIN lenses 50.

In the case in which the length of the GRIN lens 50 is set to an odd multiple of a 0.25 pitch length with respect to a light beam emitted from the input optical fiber 20, light beams emitted from the GRIN lenses 50 can be collimated. Thus, preferably, the length of the GRIN lens 50 is set to an odd multiple of a 0.25 pitch length with respect to a light beam emitted from the input optical fiber 20.

The number of the GRIN lenses 50 is the same as the number of the input optical fibers 20. The first end face 56 of the GRIN lens 50 is fusion-spliced to an end face 27 of each of the input optical fibers 20 in one to one.

In the case of the embodiment, the outer diameter of each of the GRIN lenses 50 is set greater than the diameter of the core 21 of the input optical fiber 20 and smaller than the outer diameter of the cladding 22. Consequently, in a bundle of each of the input optical fibers 20, the GRIN lenses 50 fusion-spliced to the input optical fibers respectively are separated from each other. The adjacent GRIN lenses 50 are in a non-fusion-spliced state.

The bridge fiber 30 is a tapered fiber in which one outer diameter is not decreased and another outer diameter is decreased. The bridge fiber 30 is configured of an untapered portion 33 having a constant outer diameter and a tapered portion 34 integrally formed with the untapered portion 33 whose outer diameter is decreased as more apart from the untapered portion 33.

In the bridge fiber 30 thus formed, a first end face 36 of the untapered portion 33 side is fusion-spliced to second end faces 57 of each of the GRIN lenses 50.

In the case of the embodiment, the bridge fiber 30 has no core-cladding structure specifically. The overall bridge fiber 30 is a component to transmit light beams. For example, the bridge fiber 30 is formed of silica doped with a dopant, such as germanium (Ge), to increase the refractive index.

The bridge fiber 30 can have any refractive indexes without limitation. However, from the viewpoint of reducing the reflection of a light beam entered from the GRIN lens 50 to the bridge fiber 30, preferably, the bridge fiber 30 has a refractive index similar to the refractive index around the center axis of the GRIN lens 50.

The output optical fiber 40 is an optical fiber that receives a light beam emitted from the bridge fiber 30 and emits the light beam to the subsequent stage. The output optical fibers 40 include a core 41, a cladding 42 surrounding the core 41, and a cover layer 43 covering the outer circumferential surface of the cladding 42.

The refractive index of the core 41 is set higher than the refractive index of the cladding 42. For example, the core 41 is formed of silica doped with a dopant, such as germanium (Ge), to increase the refractive index. The cladding 42 is formed of pure silica. The cover layer 43 is formed of a resin, for example. From the viewpoint of reducing the refraction of a light beam entered from the bridge fiber 30 to the core 41, preferably, the core 41 has a refractive index similar to the refractive index of the bridge fiber 30.

In the case of the embodiment, the diameter of the core 41 of the output optical fibers 40 is equal to or greater than the diameter of a second end face 37 of the tapered portion 34 side of the bridge fiber 30. The core 41 on an end face 46 of the output optical fiber 40 is fusion-spliced to the second end face 37 of the bridge fiber 30. In the output optical fiber 40, the cover layer 43 is removed near the end face 46 to be fusion-spliced to the bridge fiber 30.

As described above, in the optical fiber combiner 1 according to the embodiment, the core 21 of the input optical fiber 20 is fusion-spliced to the GRIN lens 50. The GRIN lens 50 is fusion-spliced to the bridge fiber 30. The bridge fiber 30 is fusion-spliced to the output optical fiber 40. Consequently, in the optical fiber combiner 1 according to the embodiment, the core 21 of the input optical fiber 20, the GRIN lens 50, the bridge fiber 30, and the output optical fiber 40 are optically coupled to each other.

Figure 2:
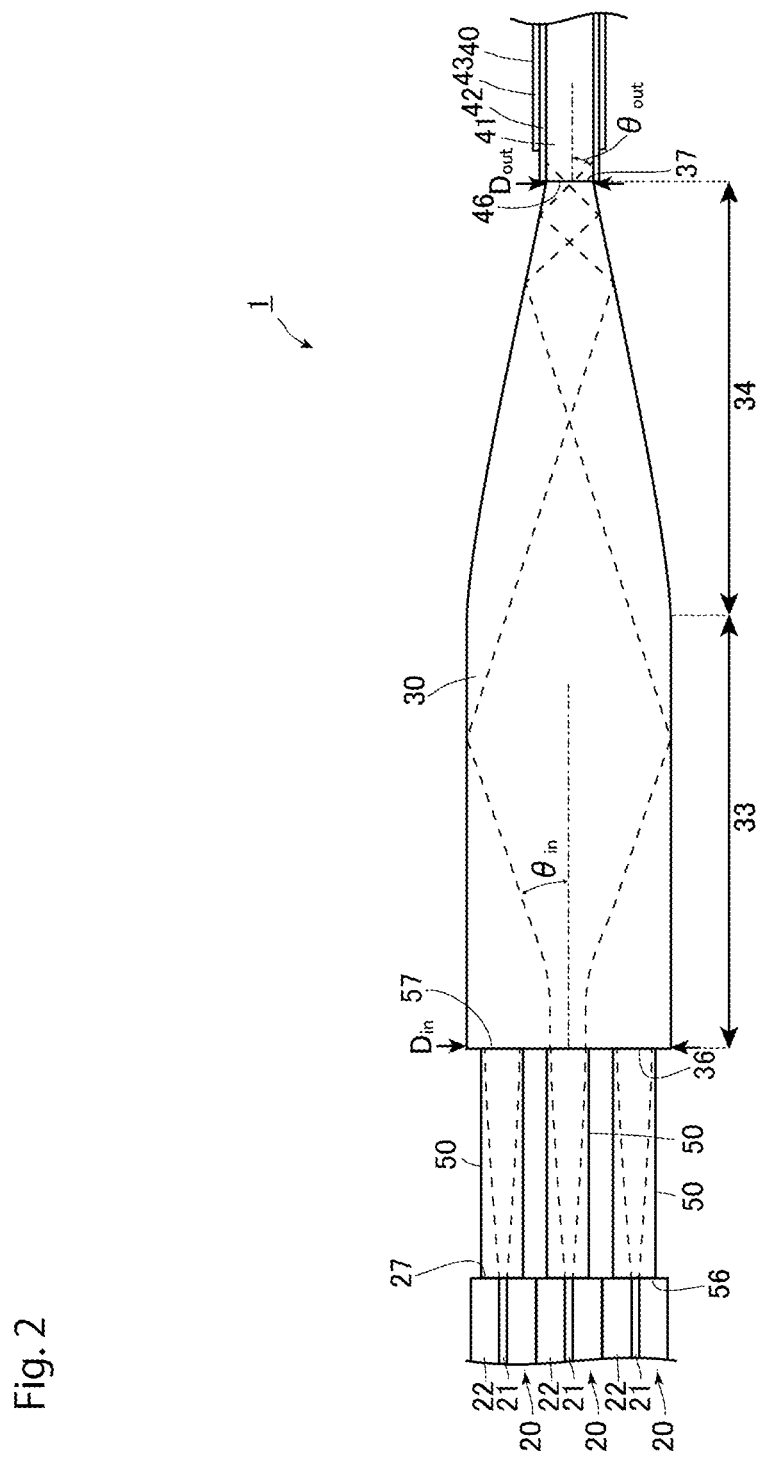
FIG. 2 is a cross sectional view taken along the center axis of the optical fiber combiner.

Next, referring to FIG. 2, the optical fiber combiner will be described in accordance with the optical viewpoint. FIG. 2 is a cross sectional view taken along the center axis of the optical fiber combiner 1. In FIG. 2, broken lines schematically depict the propagation of light beams. However, for easy understanding, in the bridge fiber 30, broken lines depict only the propagation of a light beam emitted from one GRIN lens 50.

As illustrated in FIG. 2, in the case in which a light beam is entered from the core 21 of the input optical fiber 20 to the GRIN lens 50, the light beam spreads at a predetermined angle of divergence in accordance with a numerical aperture around the center axis of the GRIN lens 50.

The light beam refracts so that the angle of divergence of the light beam is reduced as coming near to the outer circumferential surface of the GRIN lens 50. The light beam propagating through the GRIN lens 50 in this manner is emitted from the GRIN lens 50 at an angle of divergence smaller than the angle of divergence when entered, and then entered from the first end face 36, which is the incidence plane of the bridge fiber 30, to the bridge fiber 30.

The length of the GRIN lens 50 is set to a length other than a length n times a 0.5 pitch length with respect to the light beam emitted from the input optical fiber 20. Consequently, the angle of divergence of the light beam emitted from the GRIN lens 50 is made smaller than the angle of divergence in the case in which a light beam emitted from the input optical fiber 20 is directly entered to the bridge fiber 30. In FIG. 2, the broken lines depict the propagation of a light beam in the case in which the length of the GRIN lens 50 is a 0.25 pitch length with respect to the wavelength of the light beam emitted from the input optical fiber 20. In this case, the light beams emitted from the GRIN lenses 50 are collimated.

The light beam entered from the GRIN lens 50 to the bridge fiber 30 spreads and propagates through the bridge fiber 30, and reaches the tapered portion 34 of the bridge fiber 30. In the tapered portion 34, at least a part of the light beam propagates as reflecting off the outer circumferential surface of the bridge fiber 30. The angle of divergence of the light beam is increased in every time when the light beam reflects off the outer circumferential surface in a tapered shape. In other words, the light beam reflecting off the outer circumferential surface of the bridge fiber 30 has a greater angle with respect to the axial direction of the bridge fiber 30.

The light beam propagating through the tapered portion 34 is emitted from the end face 37 of the tapered portion 34, which is the light emitting face of the bridge fiber 30, at a predetermined angle of divergence, entered from the end face of the core, which is the incidence plane of the output optical fiber 40, to the core 41, and then the light beam propagates through the output optical fiber 40.

In this manner, the light beam in turn propagates through the input optical fiber 20, the GRIN lens 50, the bridge fiber 30, and the output optical fiber 40.

The angle of divergence of a light beam, which is emitted from the GRIN lens 50 and then entered to the bridge fiber 30, is defined as $\theta_{in}$. The angle of divergence of a light beam emitted from the bridge fiber 30 is defined as $\theta_{out}$. The maximum angle of incidence of a light beam entered to the output optical fiber 40 is defined as $\theta_{max}$. In this case, when the divergence angle $\theta_{out}$ of a light beam emitted from the bridge fiber 30 is $\theta_{max}$ or less, the light beam entered from the bridge fiber 30 to the output optical fiber 40 can be prevented from leaking from the output optical fiber 40.

The diameter of the first end face 36, which is the incidence plane of the bridge fiber 30, is defined as $D_{in}$. The diameter of the second end face 37, which is the light emitting face of a light beam, is defined as $D_{out}$. In this case, the relationship between the divergence angle $\theta_{in}$ and the divergence angle $\theta_{out}$ is expressed by Expression 1.

$$\theta_{out} = \theta_{in} \times \frac{D_{in}}{D_{out}} \quad (1)$$

Thus, in order that $\theta_{out}$ is equal to or smaller than $\theta_{max}$ as described above, the divergence angle $\theta_{in}$ of a light beam, which is emitted from the GRIN lens 50 and diverged in the bridge fiber 30, only has to satisfy Expression 2.

$$\theta_{in} \leq \theta_{max} \times \frac{D_{out}}{D_{in}} \quad (2)$$

In other words, even though light beams emitted from the GRIN lenses 50 are uncollimated, the light beams can be prevented from leaking from the output optical fiber 40 in any configurations in which the GRIN lens 50, the bridge fiber 30, and the output optical fiber 40 are configured so that the angle of divergence of a light beam entered from the GRIN lens 50 to the bridge fiber 30 satisfies Expression 2.

Figure 3:
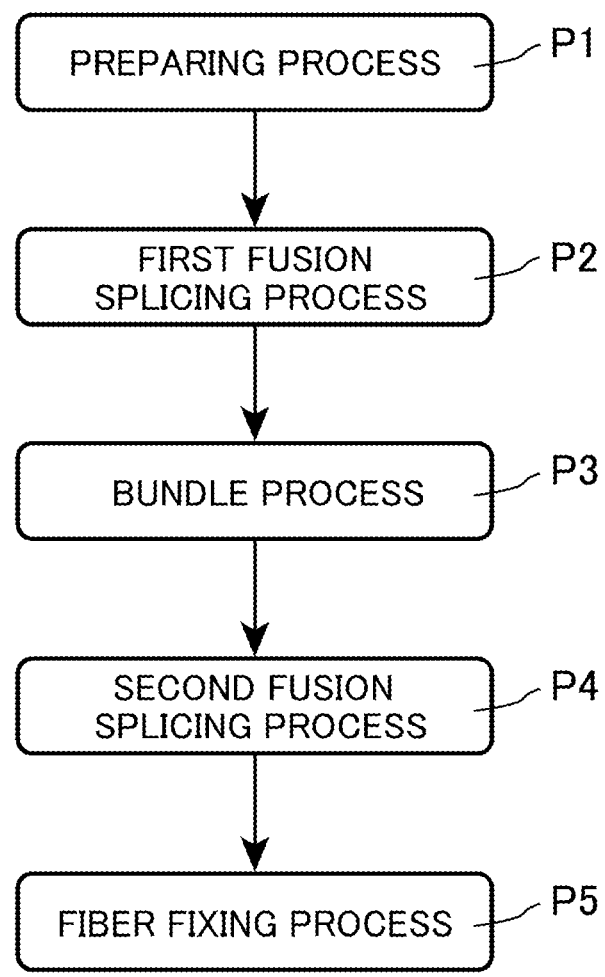
FIG. 3 is a flowchart of the manufacturing process steps of the optical fiber combiner.

Next, referring to FIGS. 3 to 4D, a manufacturing method for the optical fiber combiner 1 will be described. FIG. 3 is a flowchart of the manufacturing process steps of the optical fiber combiner 1. FIGS. 4A to 4D are diagrams of the manufacturing process steps of the optical fiber combiner 1.

As illustrated in FIG. 3, the manufacturing method for the optical fiber combiner 1 according to the embodiment includes a preparing process P1, a first fusion splicing process P2, a bundle process P3, a second fusion splicing process P4, and a fiber fixing process P5 as main processes.

The preparing process P1 is a process of preparing the components of the optical fiber combiner 1. More specifically, the plurality of input optical fibers 20, the plurality of GRIN lenses 50, the bridge fiber 30, and the output optical fiber 40 are prepared.

Figure 4A:
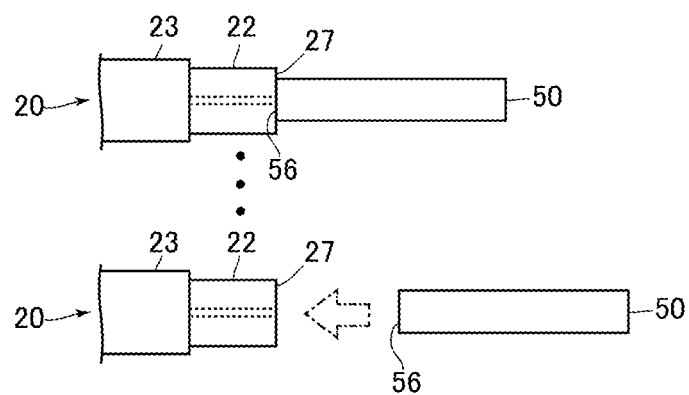
FIGS. 4A to 4D are diagrams of the manufacturing process steps of the optical fiber combiner.

As illustrated in FIG. 4A, the first fusion splicing process P2 is a process of fusion-splicing the first end face 27 of each of the input optical fibers 20 to the first end face 56 of each of the GRIN lenses 50. More specifically, first, in the input optical fiber 20, the cover layer 23 to be fusion-spliced to the GRIN lens 50 is removed near the end face 27. The cover layer 23 may be removed in the preparing process P1. Subsequently, the end faces are fusion-spliced to each other, with the center of the end face 27 of the input optical fiber 20 being matched with the center of the end face 56 of the GRIN lens 50. The center of the end face 27 of the input optical fiber 20 is not necessarily matched with the center of the end face of the GRIN lens 50. However, more preferably, the centers are matched with each other. Here, the length of the GRIN lens may be adjusted in a desired length in the preparing process P1. Alternatively, the length of the GRIN lens may be adjusted by cutting the GRIN lens after the GRIN lens is fusion-spliced to the input optical fiber 20 in a length longer than the finally desired length.

Figure 4B:
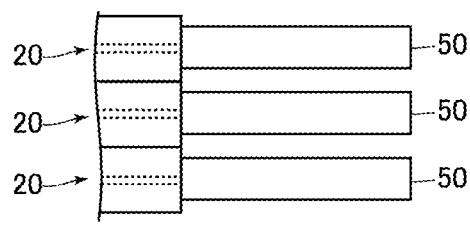
Figure 4C:
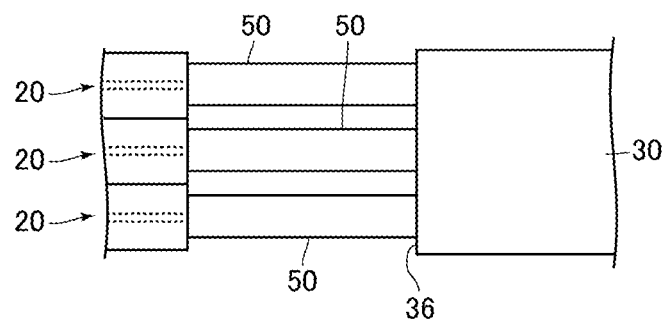
Figure 4D:
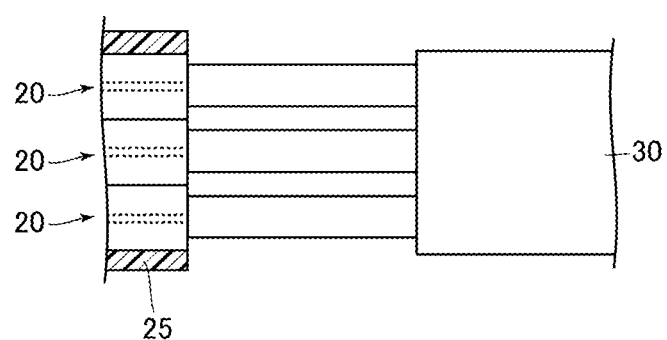

As illustrated in FIG. 4B, the bundle process P3 is a process of bundling the claddings 22 of the end portions on the first end face 27 side of each of the input optical fibers 20, with the side surfaces being in contact with each other. More specifically, for example, the claddings 22 are each fixed to a predetermined portion of a jig, and then the claddings 22 are bundled with the fixing of the jig, with the adjacent side surfaces being in contact with each other As illustrated in FIG. 4C, the second fusion splicing process P4 is a process of fusion-splicing the second end faces 57 of each of the GRIN lenses 50 to the end face 36 of the untapered portion 33, which is the incidence plane of the bridge fiber 30. More specifically, for example, the bridge fiber 30 is fixed to a predetermined portion of the jig fixing the claddings 22. With the fixing of the jig, the second end faces 57 of the GRIN lenses 50 fusion-spliced 3 to the input optical fiber 20 face the end face 36, which is the incidence plane of the bridge fiber 30. In this state, the end faces are fusion-spliced to each other.

As illustrated in FIG. 4D, the fiber fixing process P5 is a process of providing the bundle cover layer 25 that collectively covers the claddings 22 bundled with the adjacent side surfaces being in contact with each other. More specifically, for example, the claddings 22 are bundled with the adjacent side surfaces being in contact with each other. An uncured thermosetting resin is applied to the claddings 22, and then heated. The thermosetting resin is then cured to be the bundle cover layer 25. In FIG. 4D, for easy understanding, only the bundle cover layer 25 is illustrated in a cross section.

As described above, in the optical fiber combiner 1 according to the embodiment, the angle of divergence of a light beam entered from the GRIN lens 50 to the bridge fiber 30 is made smaller than the angle of divergence in the case in which a light beam is directly entered from the input optical fiber 20 to the bridge fiber 30.

Consequently, in the bridge fiber 30, even though the light beam repeatedly reflects off and propagates to cause an increase in the angle of divergence, the angle of divergence of a light beam emitted from the bridge fiber 30 can be made smaller. Therefore, the optical fiber combiner can reduce light beams to be entered to the output optical fiber 40 at an angle exceeding the numerical aperture of the output optical fiber 40, and can reduce losses of light beams caused by the leakage of the light beams from the output optical fiber 40.

In the case of manufacturing the optical fiber combiner 1 according to the embodiment, the GRIN lens 50 is fusion-spliced to the first end face 27 of the input optical fiber 20 respectively, and then the claddings 22 of the end portions on the first end face 27 side are bundled so that the adjacent side surfaces are in contact with each other.

In the bundling, the outer diameter of the GRIN lens fusion-spliced respectively to the first end face of each of the input optical fibers 20 is set greater than the diameter of the core of the input optical fiber 20 and smaller than the outer diameter of the cladding. Consequently, the GRIN lenses 50 are separated from each other.

In this state, the second end faces 57 of each of the GRIN lenses 50 are fusion-spliced to the end face 36, which is the incidence plane of the bridge fiber 30. Therefore, as illustrated in FIG. 4C, each of the GRIN lenses 50 can be fusion-spliced to the incidence plane of the bridge fiber 30 as the GRIN lenses 50 are separated from each other without fusion-splicing the GRIN lenses 50 to each other, and thus it is possible to prevent the breakage of the fusion-spliced portion caused by an external force applied to the fusion-spliced portion. Accordingly, the optical fiber combiner 1 and a manufacturing method for the optical fiber combiner 1 that can improve mechanical strength are provided.

In the case of the embodiment, the fiber fixing process P5 is provided, in which the bundle cover layer 25 is provided to collectively cover the claddings 22 bundled with the adjacent side surfaces being in contact with each other.

Thus, in the optical fiber combiner 1 according to the embodiment, the bundle cover layer 25 fixes the input optical fibers 20 as the cladding 22 of each of the input optical fibers 20 are bundled. Consequently, even though vibrations, an impact, or an external force, such as bending and tensile, are applied to the optical fiber combiner 1, a stress is nearly equally applied to the input optical fibers 20 and the GRIN lens 50 fusion-spliced to the input optical fiber 20. Therefore, the mechanical strength of the optical fiber combiner 1 can be further improved, compared with the case in which the bundle cover layer 25 is not provided.

In the embodiment, the fiber fixing process P5 as described above is performed after the second fusion splicing process. Thus, it is possible to prevent the thermal degradation of the bundle cover layer 25 caused by heating the bundle cover layer 25 in fusion splicing.

Figure 7:
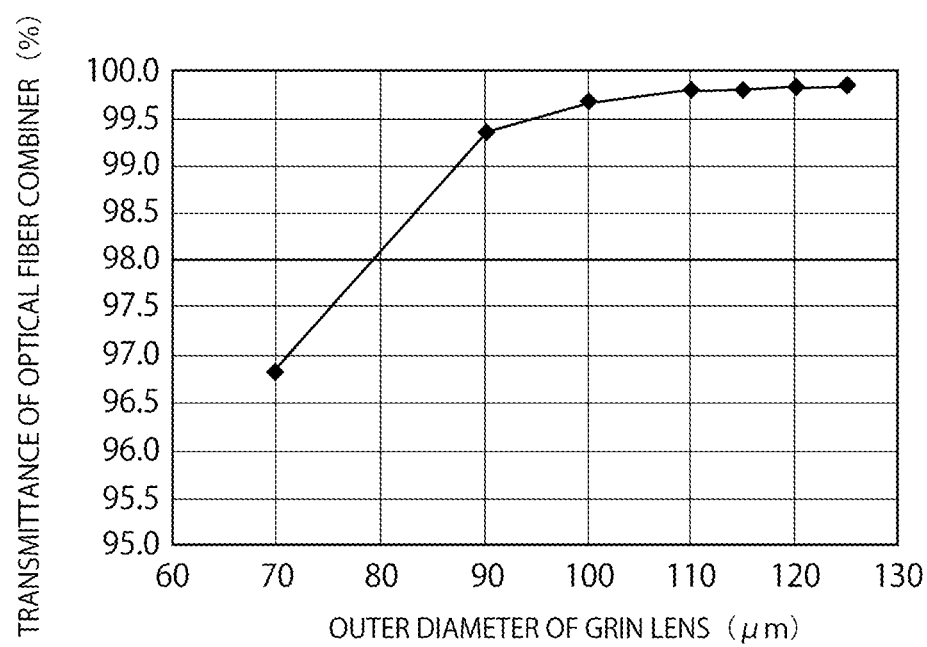
FIG. 7 is a graph of the relationship between the outer diameter of a GRIN lens and the transmittance of an optical fiber combiner.

Here, FIG. 7 is the relationship between the outer diameter of the GRIN lens 50 and the transmittance of the optical fiber combiner 1. In FIG. 7, the outer diameter of the cladding 22 of the input optical fiber 20 is set to 125 µm, the diameter $D_{in}$ of the first end face 36 of the bridge fiber 30 is set to 380 µm, the diameter $D_{out}$ of the second end face 37 is set to 50 µm, and the outer diameter of the core 41 of the output optical fiber 40 is set to 50 µm. As illustrated in FIG. 7, it can be confirmed that the transmittance of the optical fiber combiner 1 is decreased in association with a decrease in the outer diameter of the GRIN lens 50. In other words, a decrease in the outer diameter of the GRIN lens 50 causes a decrease in the beam size of a light beam emitted from the GRIN lens 50. Consequently, the divergence angle $\theta_{in}$ tends to increase.

On the other hand, from the viewpoint of decreasing the leakage of a light beam, preferably, the divergence angle $\theta_{in}$ of a light beam entered to the bridge fiber 30 satisfies Expression 2 above. In other words, preferably, the lower limit of the outer diameter of the GRIN lens 50 is determined using Expression 2 above.

(2) Second Embodiment

Next, a second embodiment of the present invention will be described. Components the same as or equivalent to the components of the first embodiment are designated the same reference numerals and signs, and the overlapping description is omitted unless otherwise specified.

Figure 5:
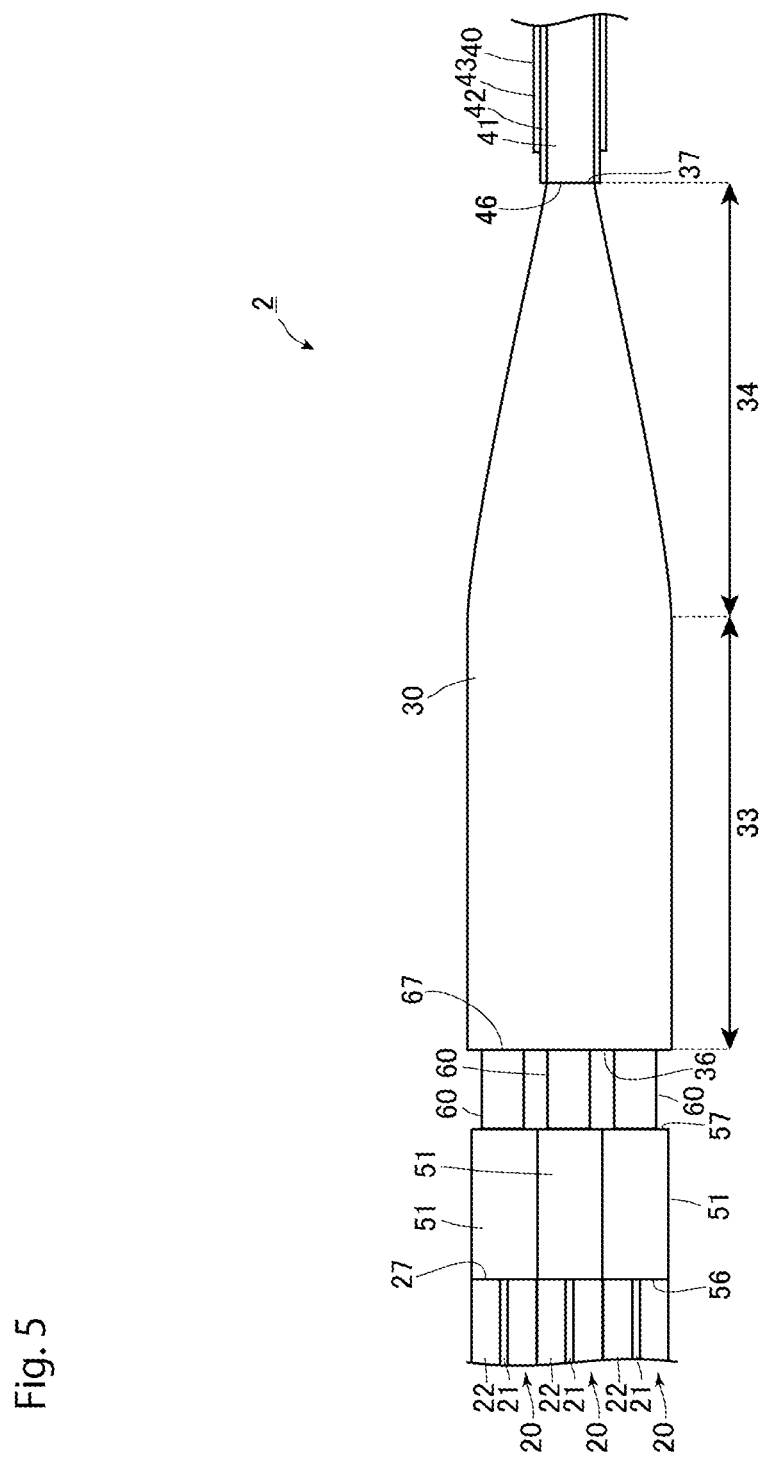
FIG. 5 is a diagram of an optical fiber combiner according to a second embodiment at the view point the same as the view point in FIG. 2.

FIG. 5 is a diagram of an optical fiber combiner according to the second embodiment at the view point the same as the view point in FIG. 2. As illustrated in FIG. 5, an optical fiber combiner 2 according to the embodiment is different from the optical fiber combiner 1 according to the first embodiment in that the GRIN lens 50 according to the first embodiment is changed to a GRIN lens 51 and a plurality of intermediate rod 60 is newly provided.

The GRIN lens 51 has an outer diameter different from the outer diameter of the GRIN lens 50 according to the first embodiment. In other words, the outer diameter of the GRIN lens 50 according to the first embodiment is set greater than the diameter of the core 21 of the input optical fiber 20 and smaller than the outer diameter of the cladding 22. On the other hand, the outer diameter of the GRIN lens 51 according to the embodiment is similar to the outer diameter of the cladding 22 of the input optical fiber 20. The configurations of the GRIN lens 51 are the same as the configurations of the GRIN lens 50 according to the first embodiment except the outer diameter of the GRIN lens 51.

The intermediate rod 60 is a rod-shaped glass member that relays the GRIN lens 51 to the bridge fiber 30. The refractive index of the intermediate rod 60 is similar to the refractive index of the bridge fiber 30. The intermediate rod 60 has no refractive index profile. The outer diameter of the intermediate rod 60 is set greater than the diameter of the core 21 of the input optical fiber 20 and smaller than the outer diameter of the cladding 22.

The number of the intermediate rod 60 is the same as the number of the input optical fibers 20 and the number of the GRIN lenses 51. A first end face 66 of each of the intermediate rods 60 is fusion-spliced to the second end face 57 of the GRIN lens 51 in one to one. Each of the second end faces 67 of the intermediate rod 60 is fusion-spliced to the first end face 36 of the bridge fiber 30 respectively.

In the case of manufacturing the optical fiber combiner 2 thus configured, the contents of the preparing process P1, the first fusion splicing process P2, and the second fusion splicing process P4 according to the first embodiment are changed.

In other words, in the preparing process P1 according to the first embodiment, for the components of the optical fiber combiner 1, the plurality of input optical fibers 20, the plurality of GRIN lenses 50, the bridge fiber 30, and the output optical fiber 40 are prepared.

On the other hand, in the preparing process P1 according to the embodiment, for the components of the optical fiber combiner 2, the plurality of input optical fibers 20, the plurality of GRIN lenses 51, the bridge fiber 30, the output optical fiber 40, and the intermediate rods 60 are prepared.

In the first fusion splicing process P2 according to the first embodiment, the end face 27 of each of the input optical fibers 20 is fusion-spliced to the first end face 56 of each of the GRIN lenses 50 in one to one.

On the other hand, in the first fusion splicing process P2 according to the embodiment, the end face 27 of each of the input optical fibers 20 is fusion-spliced to the first end face 56 of each of the GRIN lenses 50 in one to one, and the second end face 57 of the GRIN lenses 50 is fusion-spliced to the first end face 66 of each of the intermediate rods 60 in one to one. The GRIN lens 50 may be fusion-spliced to the intermediate rod 60 in the preparing process P1.

In the second fusion splicing process P4 according to the first embodiment, the second end faces 57 of each of the GRIN lenses 50 are fusion-spliced to the end face 36 of the untapered portion 33 side, which is the incidence plane of the bridge fiber 30.

On the other hand, in the second fusion splicing process P4 according to the embodiment, the second end faces 67 of each of the intermediate rods 60 are fusion-spliced to the end face 36 of the untapered portion 33 side, which is the incidence plane of the bridge fiber 30.

With this configuration, similarly to the first embodiment, the optical fiber combiner 2 according to the embodiment can be manufactured.

As described above, in the embodiment, different from the GRIN lens 50 according to the first embodiment, the GRIN lens 51 having the outer diameter similar to the outer diameter of the cladding 22 of the input optical fiber 20 is used.

However, in the embodiment, the second end face 57 of each of the GRIN lenses 51 is fusion-spliced to the intermediate rod 60 having the outer diameter greater than the diameter of the core 21 of the input optical fiber 20 and smaller than the outer diameter of the cladding 22.

Similarly to the first embodiment, the claddings 22 of the end portions on the first end face 27 side of the input optical fibers 20 are bundled so that the adjacent side surfaces are in contact with each other. The second end faces 67 of the intermediate rods 60 fusion-spliced to the input optical fibers 20 through the GRIN lenses 51 are fusion-spliced to the end face 36, which is the incidence plane of the bridge fiber 30.

Therefore, similarly to the first embodiment, in the embodiment, each of the intermediate rods 60 can be fusion-spliced to the incidence plane of the bridge fiber 30 without fusion-splicing the intermediate rods 60 to each other, with the intermediate rods 60 being separated from each other. Thus, the fusion-spliced portion can be prevented from being broken caused by an external force applied to the fusion-spliced portion.

In the embodiment, the light beam emitted from the input optical fiber 20 is entered to the bridge fiber 30 through the intermediate rod 60, with the angle of divergence being smaller through the GRIN lens 50 than the angle of divergence in the case in which a light beam is directly entered from the input optical fiber 20 to the bridge fiber 30. Therefore, similarly to the first embodiment, in the embodiment, the angle of divergence of a light beam entered to the output optical fiber 40 can be reduced. Accordingly, losses of light beams at the output optical fiber 40 can be decreased.

In the optical fiber combiner 2 according to the embodiment, each of the GRIN lenses 50 and the bridge fiber are fusion-spliced to the intermediate rod 60. Consequently, it is possible to reduce the deformation of the GRIN lens 51 caused by heat in fusion splicing, compared with the case of the first embodiment in which the bridge fiber 30 is directly fusion-spliced to each of the GRIN lenses 50. More specifically, in the case in which the GRIN lens 51 is doped with a dopant, such as germanium, having an action to decrease the softening point, the effect of introducing the intermediate rod 60 is great.

Accordingly, the optical fiber combiner 2 according to the embodiment can reduce a change in the characteristics of the GRIN lens 51, and thus can enter a light beam having a value close to the design value to the output optical fiber 40.

The intermediate rod 60 has no refractive index profile. Thus, even though the intermediate rod 60 is deformed caused by fusion-splicing the intermediate rod 60 to the bridge fiber 30, a light beam is less affected in the intermediate rod 60.

(3) Third Embodiment

Next, a laser device using the optical fiber combiner will be described. Here, the case of using the optical fiber combiner 1 according to the first embodiment will be described. Instead of the optical fiber combiner 1, the optical fiber combiner 2 according to the second embodiment may be used.

Figure 6:
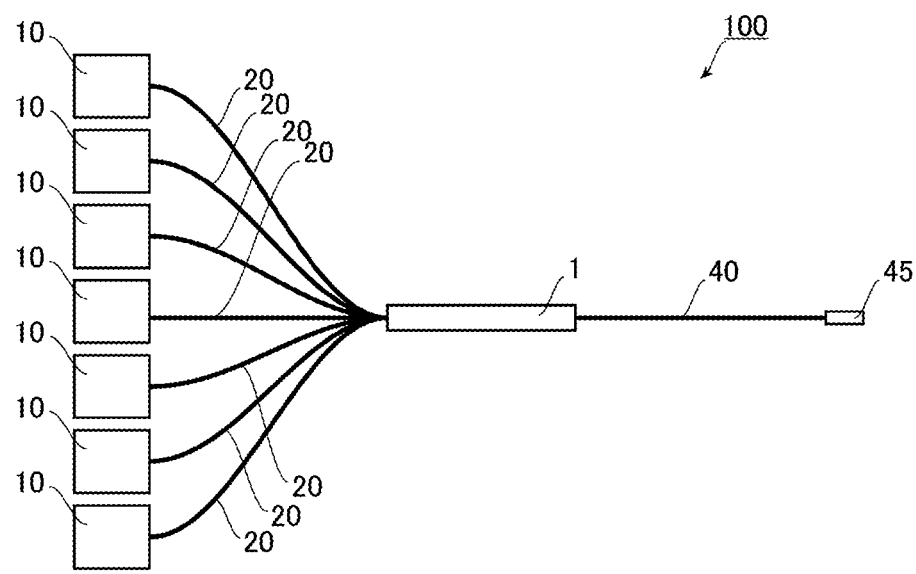
FIG. 6 is a diagram of a laser device according to a third embodiment.

FIG. 6 is a diagram of a laser device according to a third embodiment. As illustrated in FIG. 6, a laser device 100 includes a plurality of laser units 10, the above-describe optical fiber combiner 1, and a light beam emitting end cap 45 as main components.

Each of the laser units 10 are any devices without limitation that can emit laser light beams. For example, the laser unit 10 is formed of a fiber laser device or a semiconductor laser device. The input optical fiber 20 is connected to the emitting part of the laser unit 10. At least a part of the input optical fiber 20 is the input optical fiber 20 of the above-described optical fiber combiner 1.

The output optical fiber 40 of the optical fiber combiner 1 is extended to form the output optical fiber of the laser device 100. The light beam emitting end cap 45 is fusion-spliced to the end portion of the output optical fiber. The light beam emitting end cap 45 is configured of a glass rod having a diameter greater than the diameter of the core 41 of the output optical fiber 40. The end face on the opposite side of the end face to be fusion-spliced to the output optical fiber 40 is the light emitting face.

In the laser device 100 thus configured, laser light beams emitted from each of the laser units 10 propagate through the input optical fibers 20, and reach the optical fiber combiner 1. As described above, in the optical fiber combiner 1, the laser light beams are entered from the input optical fiber 20 to the GRIN lens 50, and the angle of divergence is reduced.

The laser light beams with the reduced angle of divergence are entered to the bridge fiber 30, combined at the tapered portion 34 of the bridge fiber 30, and emitted to the output optical fiber 40. In the processes, as described above, in the optical fiber combiner 1, losses of the light beams at the output optical fiber 40 are decreased. Thus, the laser light beams emitted from each of the laser units 10 are efficiently entered to the output optical fiber 40. The laser light beams propagating through the output optical fiber 40 are entered to the light beam emitting end cap 45. The diameter of the laser light beams is increased, and the laser light beams are emitted from the emission face of the light beam emitting end cap 45.

The laser device 100 according to the embodiment includes the optical fiber combiner 1 according to the first embodiment. Consequently, the mechanical strength is improved, compared with the case in which no optical fiber combiner 1 is provided. Accordingly, the laser device 100 that can improve mechanical strength is provided.

(4) Other Embodiments

As described above, the first to third embodiments are described as examples. However, the present invention is not limited to the foregoing embodiments.

For example, in the foregoing embodiments, the fiber fixing process P5 is performed after the second fusion splicing process P4. The fiber fixing process P5 may be performed after the first fusion splicing process P2. In this case, the relative positions of the input optical fibers are fixed. Thus, it is possible to reduce the degradation of fusion splicing strength and the occurrence of fusion splicing losses caused by the displacement of the relative positions in fusion splicing.

In the foregoing embodiments, the claddings 22 of the end portions on the first end face 27 side of the input optical fibers 20 are bundled with the adjacent side surfaces being in contact with each other. However, the entire claddings 22 may be bundled with the adjacent side surfaces being in contact with each other. In other words, in the plurality of input optical fibers 20, the claddings 22 of the end portions at least on the first end face 27 side only have to be bundled.

In the foregoing embodiments, the bundle cover layer 25 that collectively covers a plurality of claddings 22 is provided in the fiber fixing process P5. However, the bundle cover layer 25 may be omitted. A cover layer may be provided to collectively cover the plurality of claddings 22 and the GRIN lenses 50 fusion-spliced to the claddings 22. A cover layer may be provided to collectively cover only the GRIN lens 50 without covering the claddings 22. Similarly, a cover layer may be provided to collectively cover the GRIN lenses 51 and the intermediate rods 60 fusion-spliced to the GRIN lenses 51. A cover layer may be provided to collectively cover only the intermediate rods 60. The Young's modulus of such a cover layer is lower than the Young's modulus of the GRIN lens 50, which is a glass member. The material of the cover layer may be the same as or different from the material of the bundle cover layer 25. In the case in which the above-described cover layer is provided, a stress produced on the fusion-spliced portion to the GRIN lens 50 or the intermediate rod 60 is decreased in applying force to bend the input optical fiber 20 or the output optical fiber 40. Consequently, shear, for example, can be decreased. Moreover, the above-described cover layer can protect the GRIN lens 50 or the intermediate rod 60, which is a glass member, and prevent flaws.

In the foregoing embodiments, the bridge fiber 30 has no core-cladding structure. The bridge fiber 30 may have the core-cladding structure. In the case in which a bridge fiber 30 having a core-cladding structure is adapted, the second end face 57 of the GRIN lens 50 or the second end face 67 of the intermediate rod 60 is fusion-spliced to the core end face.

In the foregoing embodiments, in the bridge fiber 30, a part of the portion to transmit a light beam entered from the glass member (the GRIN lens 50 or the intermediate rod 60) is the tapered portion 34. The portion to transmit a light beam may be entirely the tapered portion. In other words, in the bridge fiber 30, the tapered portion only has to be formed on at least a part of the portion to transmit the light beam entered from the glass member, the tapered portion being gradually tapered in diameter as more apart from the glass member.

In the foregoing embodiments, the GRIN lens 50 or 51 is adapted as the divergence angle reducing member. However, the divergence angle reducing member is not limited to the GRIN lens 50 or 51. The divergence angle reducing member is any members that can emit a light beam entered from the input optical fiber 20 at an angle of divergence smaller than an angle of divergence of the entered light beam. For example, a thermally-diffused expanded core (TEC) fiber may be used, in which a dopant, such as germanium, which is included in the core and increases the refractive index, is diffused in the cladding by heating the optical fiber. In this case, the end portion of the input optical fiber 20 is heated to form a TEC fiber. Thus, the input optical fiber 20 can be integrally formed with the divergence angle reducing member.

In the foregoing embodiments, the GRIN lenses 50 or the intermediate rods 60 are separated from each other, and a gap is provided between the adjacent GRIN lenses 50 or the adjacent intermediate rods 60. However, as described above, in the case in which the GRIN lenses 50 or the intermediate rods 60 are covered with the cover layer, no gap may be provided. The GRIN lenses 50 or the intermediate rods 60 may be in contact with each other when the adjacent GRIN lenses 50 or the adjacent intermediate rods 60 are not fusion-spliced and not fixed to each other. In other words, the GRIN lenses 50 or the intermediate rods 60 only have to be in a non-fusion-spliced state.

In the foregoing second embodiment, the GRIN lens 51, which is the divergence angle reducing member, is provided. However, the GRIN lens 51 may be omitted. In the case in which the GRIN lens 51 is omitted, the tapered portion 34 of the bridge fiber 30 are not necessarily formed.

In the foregoing third embodiment, each of the input optical fibers 20 of the optical fiber combiner 1 is extended, and a laser light beam from each of the laser units 10 is directly entered to the input optical fiber 20. A laser light beam may be entered from each of the laser units 10 to the input optical fiber 20 through another optical fiber. In the foregoing third embodiment, the output optical fiber 40 of the optical fiber combiner 1 is extended, and a laser light beam is directly transmitted from the output optical fiber 40 to the light beam emitting end cap 45. However, a laser light beam may be transmitted to the light beam emitting end cap through another optical fiber.

The present invention is applicable to various fields in which laser devices are used, such as processing fields and medical fields, or various fields in which optical fiber combiners are used.

REFERENCE SIGNS LIST 1, 2 . . . optical fiber combiner
10 . . . laser unit

20 . . . input optical fiber
21 . . . core
22 . . . cladding
23 . . . cover layer
30 . . . bridge fiber
31 . . . core
32 . . . cladding
33 . . . untapered portion
34 . . . tapered portion
40 . . . output optical fiber
41 . . . core
42 . . . cladding
43 . . . cover layer
45 . . . light beam emitting end cap
50, 51 . . . GRIN lens (divergence angle reducing member)
60 . . . intermediate rod
100 . . . laser device

The invention claimed is:

1. A method for manufacturing an optical fiber combiner, the method comprising:
a first fusion splicing process of fusion-splicing a first longitudinal end face of one input optical fiber of a plurality of input optical fibers to a first longitudinal end face of corresponding one glass member of a plurality of glass members, each of the input optical fibers having a core and a cladding surrounding the core, the respective glass members having an outer diameter greater than a diameter of the core and smaller than an outer diameter of the cladding;
a bundle process of bundling the cladding of an end portion at least on the first end face side of the plurality of the input optical fibers after the first fusion splicing process, with adjacent side surfaces of the claddings being in contact with each other; and
a second fusion splicing process of fusion-splicing a second longitudinal end face of the each glass member to a first end face of a bridge fiber while separating the glass members from each other in a direction perpendicular to an axial direction of the input optical fibers, the second longitudinal end face being opposite to the first longitudinal end face of the glass member.

2. The method for manufacturing an optical fiber combiner according to claim 1, further comprising a fiber fixing process of providing a bundle cover layer that collectively covers the claddings bundled with adjacent side surfaces being in contact with each other.

3. The method for manufacturing an optical fiber combiner according to claim 2, wherein the fiber fixing process is performed after the second fusion splicing process.

4. The method for manufacturing an optical fiber combiner according to claim 3, wherein the fiber fixing process includes a process of collectively covering the glass member with a cover layer having a Young's modulus lower than a Young's modulus of the glass member.

5. The method for manufacturing an optical fiber combiner according to claim 2, wherein the fiber fixing process includes a process of collectively covering the glass member with a cover layer having a Young's modulus lower than a Young's modulus of the glass member.

6. The method for manufacturing an optical fiber combiner according to claim 1, wherein
the bridge fiber has a portion that transmits a light beam entered from the glass member, in which at least a part of the portion is formed with a tapered portion gradually tapered in diameter as more apart from the glass member, and
the glass member is a divergence angle reducing member that emits a light beam entered from the input optical fiber at an angle of divergence smaller than an angle of divergence of the entered light beam.

7. An optical fiber combiner comprising:
a plurality of input optical fibers each having a core and a cladding surrounding the core;
a bridge fiber having a portion that transmits a light beam emitted from each of the input optical fibers; and
a plurality of glass members, each a glass member fusion-spliced to a longitudinal end face of corresponding one of the input optical fibers claddings and to a first end face of the bridge fiber, end portions of the claddings of the plurality of input optical fibers being bundled on at least a first end face side, adjacent side surfaces of the claddings being in contact with each other, the respective glass members having an outer diameter greater than a diameter of the core and smaller than an outer diameter of the cladding, wherein
the glass members adjacent to each other are in a non-fusion-spliced state and the glass members are separated from each other in a direction perpendicular to an axial direction of the input optical fibers.

8. A laser device comprising:
an optical fiber combiner according to claim 7; and
a plurality of laser units that enters a laser light beam to each of the input optical fibers.

9. An optical fiber combiner comprising:
a plurality of input optical fibers having a core and a cladding surrounding the core;
a plurality of rod-shaped divergence angle reducing members that emits a light beam entered from the input optical fiber at an angle of divergence smaller than an angle of divergence of the entered light beam;
a bridge fiber having a portion that transmits a light beam entered from each of the divergence angle reducing members, in which at least a part of the portion is formed with a tapered portion gradually tapered in diameter as more apart from the divergence angle reducing member side; and
an output optical fiber that receives a light beam emitted from an opposite side of the divergence angle reducing member side of the bridge fiber, wherein
an outer diameter of the divergence angle reducing member is greater than an outer diameter of the core and smaller than an outer diameter of the cladding, and
the divergence angle reducing members adjacent to each other are in a non-fusion-spliced state.

10. A laser device comprising:
an optical fiber combiner according to claim 9; and
a plurality of laser units that enters a laser light beam to each of the input optical fibers.

* * * * *